(12) United States Patent
Charron et al.

(10) Patent No.: US 10,554,770 B2
(45) Date of Patent: Feb. 4, 2020

(54) DYNAMIC COGNITIVE OPTIMIZATION OF WEB APPLICATIONS

(71) Applicant: INTERNATIONAL BUSINESS MACHINES CORPORATION, Armonk, NY (US)

(72) Inventors: David S. Charron, Rochester, MN (US); Kyle E. Gilbertson, Rochester, MN (US); Rafal P. Konik, Oronoco, MN (US); Nicholas T. Lawrence, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/693,507

(22) Filed: Sep. 1, 2017

(65) Prior Publication Data

US 2018/0246861 A1     Aug. 30, 2018

Related U.S. Application Data

(63) Continuation of application No. 15/442,727, filed on Feb. 27, 2017.

(51) Int. Cl.
*G06F 17/20* (2006.01)
*H04L 29/08* (2006.01)

(52) U.S. Cl.
CPC .............. *H04L 67/22* (2013.01); *H04L 67/02* (2013.01)

(58) Field of Classification Search
CPC ...... G06F 17/2247; H04L 67/02; H04L 67/22
See application file for complete search history.

(56) References Cited

U.S. PATENT DOCUMENTS 6,453,353 B1 * 9/2002 Win ................. G06F 21/604
709/225
6,816,849 B1   11/2004 Halt, Jr.
(Continued)

OTHER PUBLICATIONS

Activo, "CSS and JavaScript Versioning and Minification," Activo Extensions, p. 1-5, https://extensions.activo.com/css-and-javascript-versioning.html, Accessed on Oct. 19, 2016.
(Continued)

*Primary Examiner* — Shahid K Khan
(74) *Attorney, Agent, or Firm* — Erik K. Johnson

(57) ABSTRACT

A method for dynamically and cognitively generating and delivering web build layers for web applications is provided. The method may include receiving, by a computer, file requests associated with web applications. The method may further include, in response to receiving the file requests, identifying resource files associated with the file requests and the web applications by querying, by a computer, at least one application server for the resource files. Additionally, the method may include determining, by a computer, related resource files based on the identified resource files by tracking information and user activity associated with the identified resource files. The method may also include generating web build layers by grouping, by a computer, the determined related resource files. The method may further include delivering the generated optimized web build layers to the web applications based on the tracked information and user activity.

1 Claim, 7 Drawing Sheets

(56) References Cited

U.S. PATENT DOCUMENTS

| | | | |
|---|---|---|---|
| 6,959,319 B1* | 10/2005 | Huang | G06F 17/30867 |
| | | | 705/14.73 |
| 9,038,033 B1 | 5/2015 | Hidayat | |
| 9,268,537 B1 | 2/2016 | Zhang et al. | |
| 9,596,312 B2 | 3/2017 | Ahrens | |
| 9,639,629 B1 | 5/2017 | Venkat | |
| 2002/0138331 A1* | 9/2002 | Hosea | G06Q 10/06375 |
| | | | 705/7.37 |
| 2004/0015854 A1 | 1/2004 | Tang et al. | |
| 2006/0080316 A1 | 4/2006 | Gilmore | |
| 2010/0077294 A1* | 3/2010 | Watson | G06F 17/30905 |
| | | | 715/234 |
| 2010/0125826 A1 | 5/2010 | Rice et al. | |
| 2012/0066586 A1* | 3/2012 | Shemesh | G06F 16/9574 |
| | | | 715/235 |
| 2013/0031459 A1* | 1/2013 | Khorashadi | G06F 17/2247 |
| | | | 715/234 |
| 2013/0212465 A1 | 8/2013 | Kovatch | |
| 2014/0195894 A1 | 7/2014 | Sharma | |
| 2015/0012614 A1 | 1/2015 | Kolam | |
| 2015/0046789 A1 | 2/2015 | Wei et al. | |
| 2015/0100879 A1 | 4/2015 | Nandagopal et al. | |
| 2016/0055132 A1 | 2/2016 | Garrison et al. | |
| 2016/0205166 A1 | 7/2016 | Kolam | |

OTHER PUBLICATIONS

Angin et al., "An Agent-based Optimization Framework for Mobile-Cloud Computing," Journal of Wireless Mobile Networks, Ubiquitous Computing, and Dependable Applications, 2013, p. 1-17, vol. 4, No. 2.

Anonymous, "A Method for Bootstrapping Dynamic Optimized Loaders for Web Content," An IP.com Prior Art Database Technical Disclosure, May 30, 2013, p. 1-2, IP.com No. IPCOM000227980D.

Anonymous, "A New Methodology in Code Performance Tuning for Web Application," An IP.com Prior Art Database Technical Disclosure, May 12, 2014, p. 1-13, IP.com No. IPCOM000236711D.

Chin, "Automatically Minify, Combine, Compress, and Cache *.js and *.css Files in your ASP.NET Project," CodeProject Articles, Mar. 24, 2010, p. 1-6, http://www.codeproject.com/Articles/33552/Automatically-Minify-Combine-Compress-and-Cache-js, Accessed on Oct. 19, 2016.

Kristensen, "Automatic Optimization of Images, CSS and JavaScript," Mads Kristensen—Tips and Tricks, Jun. 5. 2014, p. 1-3, http://madskristensen.net/post/automatic-optimization-of-images-css-and-javascript, Accessed on Oct. 19, 2016.

Kristensen, "Minify JavaScript," OptimizeASP.NET, p. 1-2, http://optimizeasp.net/minify-javascript, Accessed on Oct. 19, 2016.

Mell et al., "The NIST Definition of Cloud Computing," National Institute of Standards and Technology, Sep. 2011, p. 1-3, Special Publication 800-145.

Pataki, "14 Tools for Minifying Javascript," Hongkiat Blog, p. 1-3, http://www.hongkiat.com/blog/javascript-minifying-tools/, Accessed on Oct. 19, 2016.

Perdeck, "Automatically Minify and Combine JavaScript and CSS Files in any Web Site," AspAlliance Article, p. 1-22, Accessed on Oct. 19, 2016.

Siegel, "Stochastically Robust Resource Management in Heterogeneous Parallel Computing Systems," 10th International Symposium on Pervasive Systems, Algorithms, and Networks, 2009, p. 1-2, IEEE Computer Society.

Yottaa, "The ContextIntelligence Platform," Yottaa Adaptive CDN, p. 1-2, http://www.yottaa.com/product/context-intelligence-platform/, Accessed on Oct. 19, 2016.

Zakas, "Better JavaScript Minification," An A List Apart Article, Apr. 20, 2010, p. 1-8, http://alistapart.com/article/better-javascript-minification, Accessed on Oct. 19, 2016.

Zimmerman, "Automatic Minification With Node.js and RequireJS," Joe Zim's JavaScript Blog, Jul. 30, 2012, p. 1-4, https://www.joezimjs.com/javascript/automatic-minification-with-node-js-and-requirejs/, Accessed on Oct. 19, 2016.

Charron et al., U.S. Appl. No. 15/442,727, filed Feb. 27, 2017, titled "Dynamic Cognitive Optimization of Web Applications,", pp. 1-36.

IBM: List of IBM Patents or Patent Applications Treated As Related (Appendix P), Sep. 1, 2017, pp. 1-2.

* cited by examiner

DYNAMIC COGNITIVE OPTIMIZATION OF WEB APPLICATIONS

BACKGROUND

The present invention relates generally to the field of computing, and more specifically, to web applications.

Generally, optimizing a mobile web or desktop web application for use in production may increase performance and functionality. The optimization process for web applications is typically a labor-intensive process for application developers. For example, during the optimization phase of a web application's life cycle, a set of optimized web build layers may be used by application developers to optimize the web application. Specifically, each set of optimized web build layers may contain groups of hypertext markup language (HTML) files that may include cascading file sheet (CSS) files, image files, and JavaScript files for one or more features of the web applications. By using optimized web build layers, application developers can limit the amount of small individual file downloads in response to requests received by web applications during optimization, and in turn, can decrease the network traffic associated with each request.

SUMMARY

A method for dynamically and cognitively generating and delivering web build layers for a web application is provided. The method may include receiving, by a computer, a file request associated with the web application. The method may further include, in response to receiving the file request, identifying a plurality of resource files associated with the received file request and the web application by querying, by a computer, at least one application server for the plurality of resource files. Additionally, the method may include determining, by a computer, a plurality of related resource files based on the plurality of identified resource files by tracking a plurality of information and user activity associated with the plurality of identified resource files. The method may also include generating a plurality of web build layers by grouping, by a computer, the determined related resource files. The method may further include delivering the generated plurality of web build layers to the web application based on the tracked plurality of information and user activity.

A computer system for dynamically and cognitively generating and delivering web build layers for a web application is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving, by a computer, a file request associated with the web application. The method may further include, in response to receiving the file request, identifying a plurality of resource files associated with the received file request and the web application by querying, by a computer, at least one application server for the plurality of resource files. Additionally, the method may include determining, by a computer, a plurality of related resource files based on the plurality of identified resource files by tracking a plurality of information and user activity associated with the plurality of identified resource files. The method may also include generating a plurality of web build layers by grouping, by a computer, the determined related resource files. The method may further include delivering the generated plurality of web build layers to the web application based on the tracked plurality of information and user activity.

A computer program product for dynamically and cognitively generating and delivering web build layers for a web application is provided. The computer program product may include one or more computer-readable storage devices and program instructions stored on at least one of the one or more tangible storage devices, the program instructions executable by a processor. The computer program product may include program instructions to receive, by a computer, a file request associated with the web application. The computer program product may further include program instructions to, in response to receiving the file request, identify a plurality of resource files associated with the received file request and the web application by querying, by a computer, at least one application server for the plurality of resource files. Additionally, the computer program product may also include program instructions to determine, by a computer, a plurality of related resource files based on the plurality of identified resource files by tracking a plurality of information and user activity associated with the plurality of identified resource files. The computer program product may further include program instructions to generate a plurality of web build layers by grouping, by a computer, the determined related resource files. The computer program product may also include program instructions to deliver the generated plurality of web build layers to the web application based on the tracked plurality of information and user activity.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
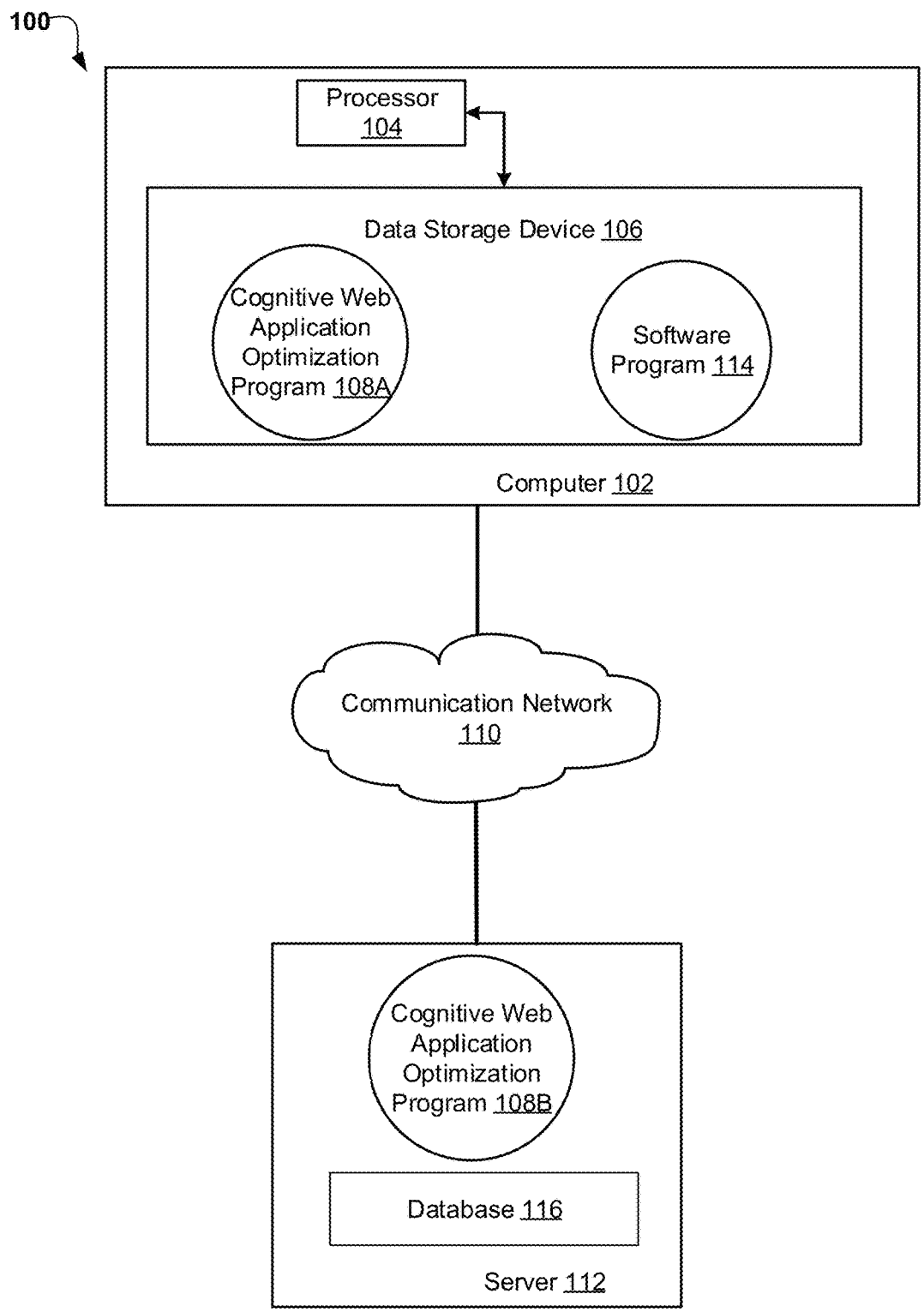
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate generally to the field of computing, and more particularly, to web applications. The following described exemplary embodiments provide a system, method and program product for dynamically and cognitively generating and delivering optimized web build layers for web applications. Specifically, the present embodiment has the capacity to improve the technical field associated with optimizing web applications by dynamically and cognitively generating optimized web build layers based on cognitively identified information and user activity associated with the web applications. More specifically, in response to receiving file requests for web content associated with web applications, the present embodiment may identify resource files associated with the file request, and may dynamically and cognitively generate optimized web build layers using the identified resource files based on tracked information and user activity.

As previously described with respect to web applications, a set of optimized web build layers may be used to optimize the web applications. For example, each set of optimized web build layers may contain groups of hypertext markup language (HTML) files that may include cascading file sheet (CSS) files, image files, and JavaScript files for one or more features of the application. Furthermore, by using optimized web build layers, application developers can limit the amount of small individual file downloads performed in response to file download requests and thereby decrease network traffic. However, and as previously described, the optimization process for web applications is a labor-intensive process for application developers. Specifically, application developers typically have to determine how and what files to group together in the optimized build layer, which can result in errors such as misgroupings in the optimized web build layers, or failing to add files to the optimized build layer, resulting in greater network traffic to transfer individual optimized files. Additionally, the optimized web build layers are generally delivered to all end users of web applications without taking into account the type of end user receiving the optimized web application and the features used by the end users, such as whether the end user is an administrator or user, or whether the end user is a business user or personal user of the web application. As such, it may be advantageous, among other things, to provide a system, method and program product for dynamically and cognitively generating and delivering optimized web build layers for web applications. Specifically, in response to receiving file requests associated with web applications, the system, method, and program product may identify resource files associated with the file requests, and may dynamically and cognitively generate optimized web build layers using the identified resource files based on tracked information and user activity.

According to at least one implementation of the present embodiment, file requests associated with web applications may be received. Next, resource files associated with the received file requests may be identified. Then, based on the identified resource files, related resource files may be determined. Next, optimized web build layers may be generated by grouping the related resource files. Then, the optimized web build layers may be delivered to the web applications based on tracked information and user activity.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for dynamically and cognitively optimizing web applications.

According to at least one implementation, file requests associated with web applications may be received. Next, resource files associated with the received file requests may be identified. Then, based on the identified resource files, related resource files may be determined. Next, optimized web build layers may be generated by grouping the related resource files. Then, the optimized web build layers may be delivered to the web applications based on tracked information and user activity.

Referring now to FIG. 1, an exemplary networked computer environment 100 in accordance with one embodiment is depicted. The networked computer environment 100 may include a computer 102 with a processor 104 and a data storage device 106 that is enabled to run a cognitive web application optimization program 108A and a software program 114. The software program 114 may be an application program such as a web or mobile web program/app, an email program/app, or a mobile program/app with network access. The cognitive web application optimization program 108A may communicate with the software program 114. The networked computer environment 100 may also include a server 112 that is enabled to run a cognitive web application optimization program 108B and a communication network 110. The networked computer environment 100 may include a plurality of computers 102 and servers 112, only one of which is shown for illustrative brevity.

According to at least one implementation, the present embodiment may also include a database 116, which may be running on server 112. The communication network 110 may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 4, server computer 112 may include internal components 800a and external components 900a, respectively, and client computer 102 may include internal components 800b and external components 900b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a set top box, a television device, a telephone, a personal digital assistant, a netbook, a laptop computer, a tablet computer, a desktop computer, or any type of computing device and dynamic digital advertisement display capable of running a program and accessing a network. According to various implementations of the present embodiment, the cognitive web application optimization program 108A, 108B may interact with a database 116 that may be embedded in various storage devices, such as, but not limited to a mobile device 102, a networked server 112, or a cloud storage service.

According to the present embodiment, a program, such as a cognitive web application optimization program 108A and 108B may run on the client computer 102 or on the server computer 112 via a communications network 110. The cognitive web application optimization program 108A, 108B may dynamically and cognitively optimize web applications. Specifically, a user using a computer, such as computer 102, may run a cognitive web application optimization program 108A, 108B, that interacts with a software program 114, such as a web application to receive file requests based on content associated with the web application, and in response to receiving the file requests, the cognitive web application optimization program 108A, 108B may identify resource files associated with the file requests, and may dynamically and cognitively generate optimized web build layers using the identified resource files based on tracked information and user activity.

Figure 2A:
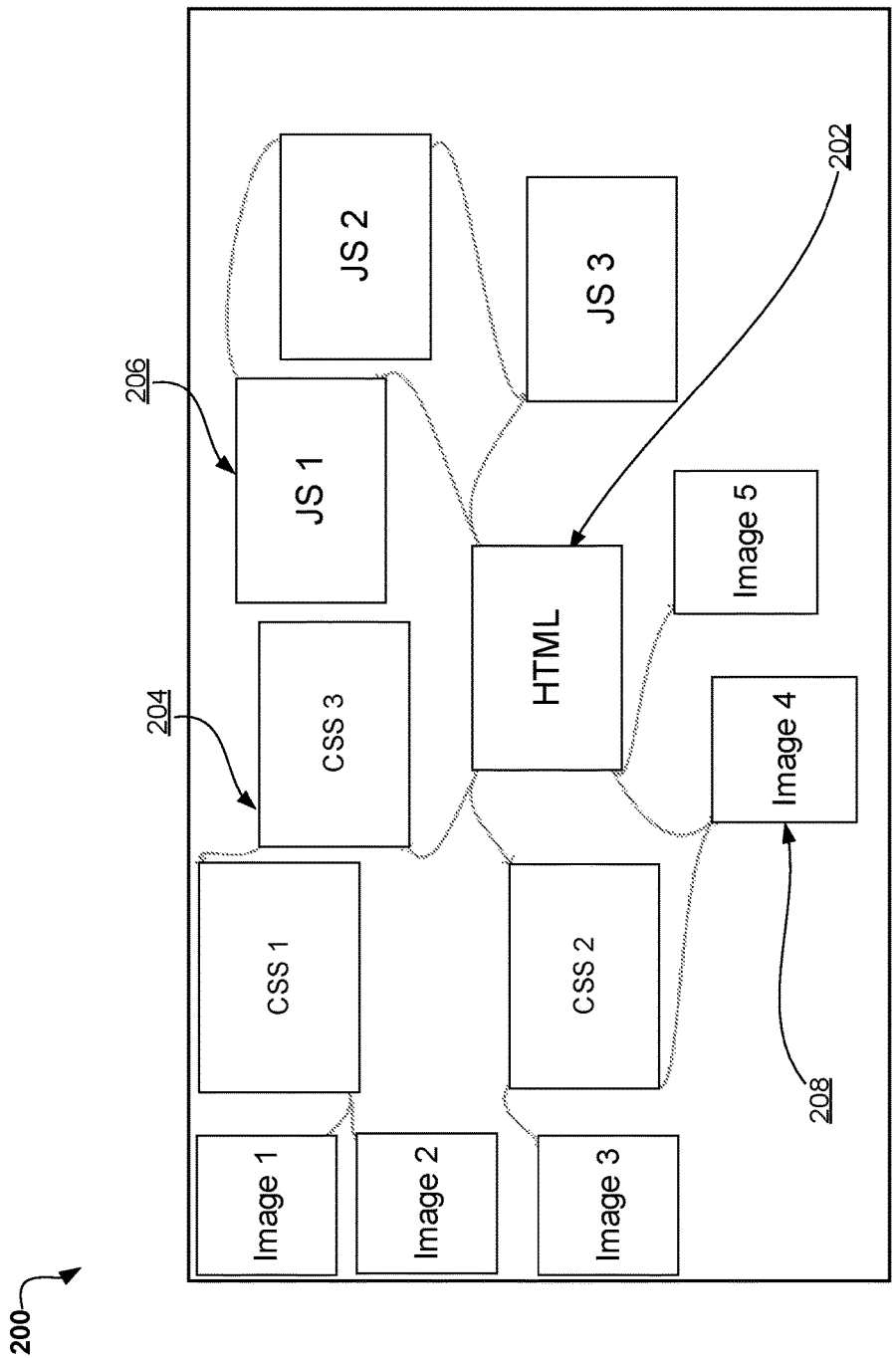
FIG. 2A is an example of resource files associated with an HTML webpage according to one embodiment.

Referring now to FIG. 2A, an example of resource files 200 associated with an HTML webpage according to one embodiment is depicted. Specifically, for example, web applications may include internet webpages that may request files to load web content associated with the web applications. Furthermore, an internet webpage may be an HTML webpage that includes an HTML resource file 202, which may further include individual resource files 200 that correspond to different features, texts, and uniform resource locator (URL) links associated with the HTML webpage as well as with the web application. More specifically, the HTML resource file 202 may include resource files 200 such as cascading file sheet (CSS) files 204, image files 208, and JavaScript files 206. Without optimization, each resource file 200 is typically individually loaded as the HTML webpage is loaded.

Figure 2B:
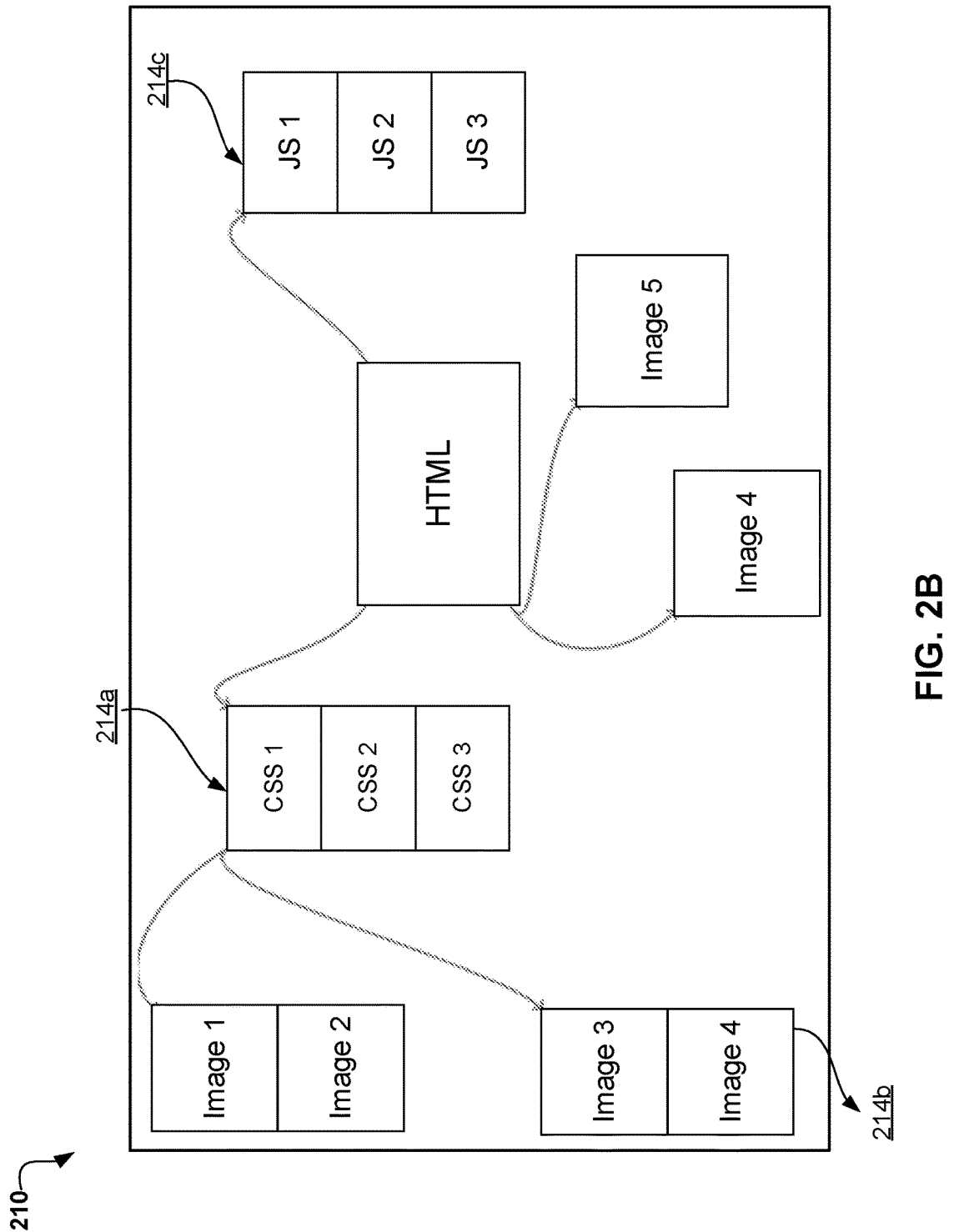
FIG. 2B is an example of optimized web build layers according to one embodiment.

Referring now to FIG. 2B, an example of optimized web build layers 210 according to one embodiment of the present invention is depicted. As previously described in FIG. 2A, an internet webpage may be an HTML webpage that includes an HTML resource file 202 (FIG. 2A), which may further include individual resource files 200 (FIG. 2A) such as CSS files 204 (FIG. 2A), image files 208 (FIG. 2A), and JavaScript files 206 (FIG. 2A). Also, as previously described, without optimization, each resource file 200 (FIG. 2A) is typically individually loaded as the HTML webpage is loaded. Specifically, when the HTML webpage is loaded without optimization, the HTML webpage may make numerous requests to a corresponding web application server for the different resource files 200 (FIG. 2A) associated with the HTML webpage. As such, the number of resource file download requests and the network traffic associated with web applications may be overwhelming. Therefore, the cognitive web application optimization program 108A, 108B (FIG. 1) may dynamically generate optimized web build layers, such as optimized web build layers 214a, 214b, and 214c, which may include resource files that may be delivered in a package to the web applications instead individually, thereby reducing the number of resource file downloads to satisfy the received file requests and decreasing the network traffic associated with web applications. More specifically, the cognitive web application optimization program 108A, 108B (FIG. 1) may generate the optimized web build layers by dynamically and cognitively identifying and grouping the resource files 200 (FIG. 2A) based on tracked information and user activity that is associated with the resource files 200 (FIG. 2A). For example, the cognitive web application optimization program 108A, 108B (FIG. 1) may generate optimized web build layers 210 by grouping the resource files 200 (FIG. 2A) that are associated with a toolbar of a web application based on the similarity in metadata and/or code. Also, for example, the cognitive web application optimization program 108A, 108B (FIG. 1) may generate the optimized web build layers by dynamically and cognitively identifying like or related resource files 200 (FIG. 2A) of the same type and grouping the related resource files 200 (FIG. 2A), such as by grouping the related CSS files 204 (FIG. 2A) to generate optimized build layer 214a, grouping the related image files 208 (FIG. 2A) to generate optimized build layer 214b, and grouping the related JavaScript files 206 (FIG. 2A) to generate optimized build layer 214c.

Figure 3:
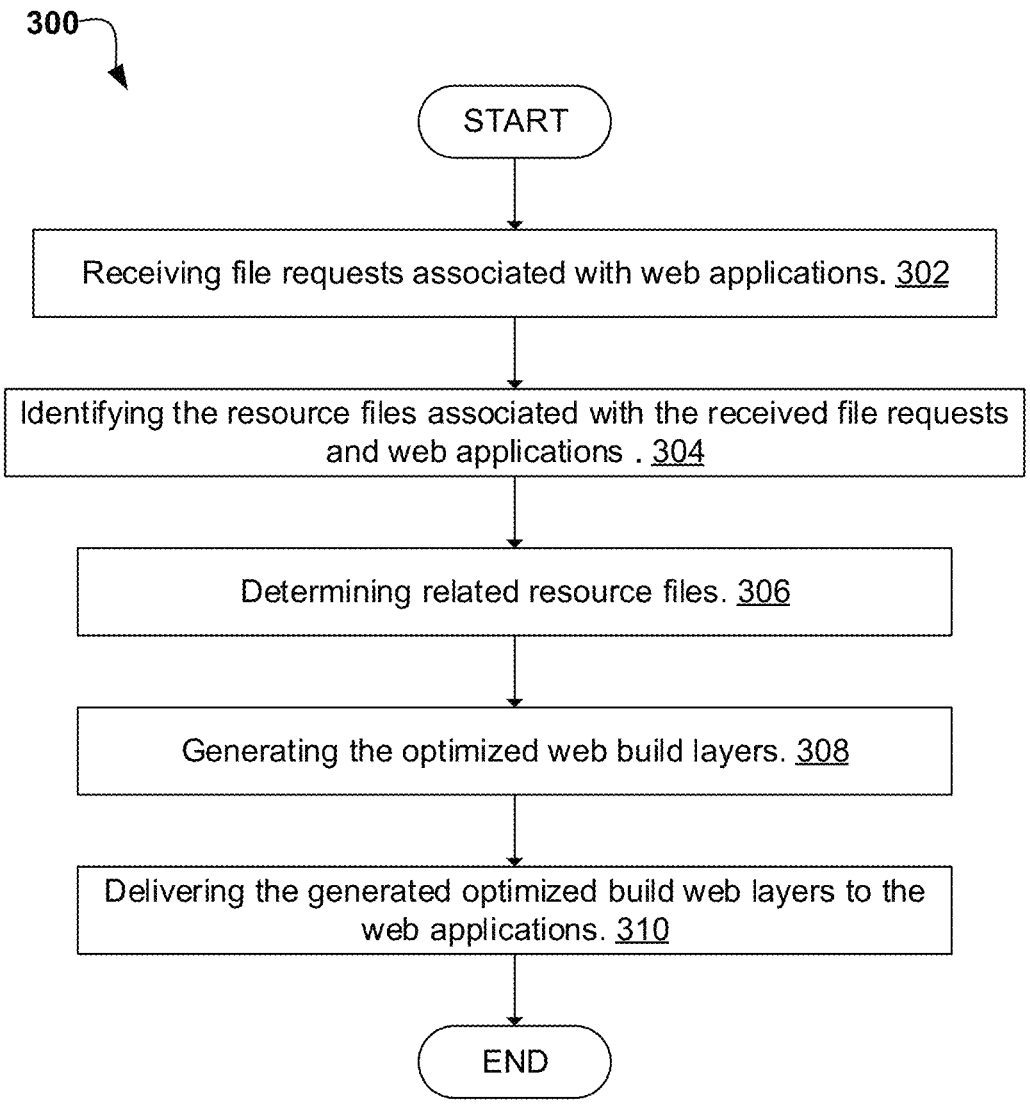
FIG. 3 is an operational flowchart illustrating the steps carried out by a program for dynamically and cognitively generating and delivering optimized web build layers for web applications according to one embodiment.

Referring now to FIG. 3, an operational flowchart 300 illustrating the steps carried out by a program for dynamically and cognitively generating and delivering optimized web build layers for web applications according to one embodiment is depicted. At 302, the cognitive web application optimization program 108A, 108B (FIG. 1) may receive file requests associated with web applications. Specifically, for example, the cognitive web application optimization program 108A, 108B (FIG. 1) may receive, via a computer, file requests associated with web applications for loading web content on the web application. For example, the file requests may be correspond to different features, texts, images, and URL links associated with HTML webpages on the web applications.

Then, at 304, the cognitive web application optimization program 108A, 108B (FIG. 1) may identify the resource files 200 (FIG. 2A) associated with the received file requests and the web applications. Specifically, for example, the cognitive web application optimization program 108A, 108B (FIG. 1) may receive file requests associated with an HTML webpage of a web application. Thereafter, according to one embodiment, the cognitive web application optimization program 108A, 108B (FIG. 1) may analyze the HTML webpage and web application associated with the received requests and, via a computer, query an application server to identify the resource files 200 (FIG. 2A) associated with the HTML webpage and web application. More specifically, and as previously described in FIG. 2A, the HTML webpage may include an HTML resource file 202 (FIG. 2A), which may further include individual resource files 200 (FIG. 2A) such as CSS files 204 (FIG. 2A), image files 208 (FIG. 2A), and JavaScript files 206 (FIG. 2A). Therefore, in response to receiving the file requests, the cognitive web application optimization program 108A, 108B (FIG. 1) may analyze the HTML webpage to identify the CSS files 204 (FIG. 2A), the image files 208 (FIG. 2A), and the JavaScript files 206 (FIG. 2A) associated with that HTML webpage.

Next, at 306, the cognitive web application optimization program 108A, 108B (FIG. 1) may determine related resource files 200 (FIG. 2A) by dynamically and cognitively tracking information and user activity associated with the identified resource files 200 (FIG. 2A). Specifically, according to one embodiment, the cognitive web application optimization program 108A, 108B (FIG. 1) may dynamically analyze the identified resource files 200 (FIG. 2A) to, via a computer, dynamically and cognitively track the information and user activity associated with the identified resource files 200 (FIG. 2A), and may use an application server, such as server 114 (FIG. 1), to gather and store the dynamically and cognitively tracked information and user activity based on the analysis. More specifically, the cognitive web application optimization program 108A, 108B (FIG. 1) may dynamically and cognitively track information and user activity such as: dependency relationships between the identified resource files 200 (FIG. 2A), whereby tracking the dependency relationship may include identifying whether the identified resource files 200 (FIG. 2A) are interdependent and/or are used together (i.e., identified resource file A may import identified resource file B); information based on the identified resource files 200 (FIG. 2A) that are specifically associated with the received requests; metadata associated with the identified resource files 200 (FIG. 2A); HTTP headers used in the received requests; the type and size of the identified resource files 200 (FIG. 2A); the frequency with which a user may or may not use the identified resources files 200 (FIG. 2A) and/or the features associated with the identified resource files 200 (FIG. 2A); and the type of user or target audience for the identified resource files 200 (FIG. 2A), such as whether the identified resource files 200 (FIG. 2A) are restricted to administrators, employees, or other specifically identified users, and/or whether the identified resource files 200 (FIG. 2A) are used for business or personal use. Thereafter, the cognitive web application optimization program 108A, 108B (FIG. 1) may determine that identified resource files 200 (FIG. 2A) may be related by determining similarities between the identified resource files 200 (FIG. 2A) based on one or more of the dynamically and cognitively tracked information and user activity.

For example, and as previously described in FIG. 2B, based on tracked information and user activity, the cognitive web application optimization program 108A, 108B (FIG. 1) may query the application server and determine that identified resource files 200 (FIG. 2A) are related based on the identified resource files 200 (FIG. 2A) being located on a toolbar of a web application and/or based on a similarity in metadata and/or code associated with the identified resource files 200 (FIG. 2A) for the toolbar. Also, for example, based on the tracked information and user activity, the cognitive web application optimization program 108A, 108B (FIG. 1) may determine that identified resource files 200 (FIG. 2A) of the same type are related resource files 200 (FIG. 2A), such as by determining that the identified CSS files 204 (FIG. 2A) may be related resource files 200 (FIG. 2A), determining that the related image files 208 (FIG. 2A) may be related resource files 200 (FIG. 2A), and determining that the related JavaScript files 206 (FIG. 2A) may be related resource files 200 (FIG. 2A).

Then, at 308, the cognitive web application optimization program 108A, 108B (FIG. 1) may generate optimized web build layers 210 (FIG. 2B) by cognitively grouping the determined related resource files 200 (FIG. 2A). As previously described at step 306, the cognitive web application optimization program 108A, 108B (FIG. 1) may determine the related resource files 200 (FIG. 2A) based on dynamically and cognitively tracking information and user activity associated with the identified resource files 200 (FIG. 2A). Thereafter, the cognitive web application optimization program 108A, 108B (FIG. 1) may generate optimized web build layers 210 (FIG. 2B) by determining the optimal (or best) groupings for the determined related resource files 200 (FIG. 2A). Specifically, and as previously described at step 306, the cognitive web application optimization program 108A, 108B (FIG. 1) may dynamically analyze the identified resource files 200 (FIG. 2A) to dynamically and cognitively track information and user activity. Then, for example, based on the tracked information and user activity, the cognitive web application optimization program 108A, 108B (FIG. 1) may determine that identified resource files 200 (FIG. 2A) of the same type may be related resource files 200 (FIG. 2A), such as by determining that the identified CSS files 204 (FIG. 2A) may be related resource files 200 (FIG. 2A), determining that the related image files 208 (FIG. 2A) may be related resource files 200 (FIG. 2A), and determining that the related JavaScript files 206 (FIG. 2A) may be related resource files 200 (FIG. 2A). Furthermore, based on the dynamically and cognitively tracked information and user activity, such as file size and network traffic, the cognitive web application optimization program 108A, 108B (FIG. 1) may determine that the related resource files 200 (FIG. 2A) of the same type may be optimally grouped to generate and deliver the optimized web build layers 210 (FIG. 2B). Therefore, for example, the cognitive web application optimization program 108A, 108B (FIG. 1) may generate the optimized web build layers 210 (FIG. 2B) by grouping the related CSS files 204 (FIG. 2A) to generate optimized build layer 214*a* (FIG. 2B), grouping the related image files 208 (FIG. 2A) to generate optimized build layer 214*b* (FIG. 2B), and grouping the related JavaScript files 206 (FIG. 2A) to generate optimized build layer 214*c* (FIG. 2B).

Next, at 310, the cognitive web application optimization program 108A, 108B (FIG. 1) may deliver the generated optimized web build layers 210 (FIG. 2B) to the web applications. More specifically, according to one embodiment, the cognitive web application optimization program 108A, 108B (FIG. 1) may send the generated optimized web build layers 210 (FIG. 2B) to the web applications based on the dynamically and cognitively tracked user activity. As previously described at step 306, the cognitive web application optimization program 108A, 108B (FIG. 1) may dynamically analyze the identified resource files 200 (FIG. 2A) to dynamically and cognitively track information and user activity that may, for example, include the frequency with which a user may or may not use the identified resources files 200 (FIG. 2A) and/or the features associated with the identified resource files 200 (FIG. 2A), and the type of user or target audience receiving the generated optimized web build layers 210 (FIG. 2B), such as whether the generated optimized web build layers 210 (FIG. 2B) include identified resource files 200 (FIG. 2A) that are restricted to administrators, employees, or other specifically identified users only, and/or whether the identified resource files 200 (FIG. 2A) are used for business or personal use. For example, the cognitive web application optimization program 108A, 108B (FIG. 1) may send the optimized web build layers 210 (FIG. 2B) that include the resource files 200 (FIG. 2A) that may be frequently used by a user (such as resource files associated with links frequently clicked on by a user), and may not send the optimized web build layers 210 (FIG. 2B) that do not include frequently used identified resource files 200 (FIG. 2A). Also, for example, the cognitive web application optimization program 108A, 108B (FIG. 1) may not send to a general end-user the optimized web build layers 210 (FIG. 2B) that include identified resource files 200 (FIG. 2A) restricted to administrators only.

It may be appreciated that FIGS. 2A, 2B, and 3 provide only illustrations of one implementation and do not imply any limitations with regard to how different embodiments may be implemented. Many modifications to the depicted environments may be made based on design and implementation requirements. For example, based on the dynamically and cognitively tracked information and user activity, the cognitive web application optimization program 108A, 108B (FIG. 1) may further learn and suggest changes to the resource files 200 (FIG. 2A) associated with web applications to further reduce the amount of file download requests/transactions and network traffic.

Figure 4:
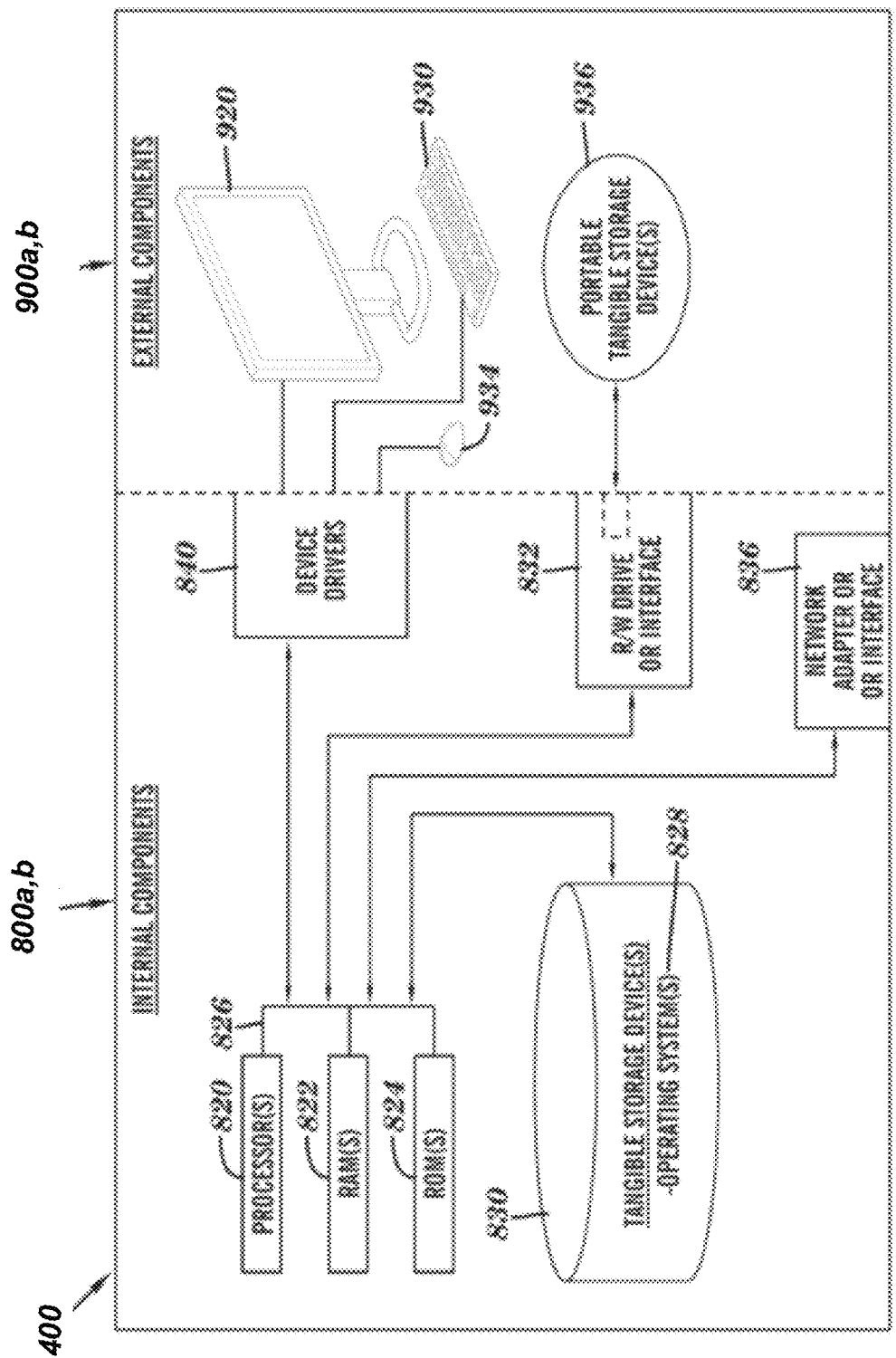
FIG. 4 is a block diagram of the system architecture of a program for dynamically and cognitively generating and delivering optimized web build layers for web applications according to one embodiment.

FIG. 4 is a block diagram 400 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 800a, b and external components 900a, b illustrated in FIG. 4. Each of the sets of internal components 800a, b includes one or more processors 820, one or more computer-readable RAMs 822, and one or more computer-readable ROMs 824 on one or more buses 826, and one or more operating systems 828 and one or more computer-readable tangible storage devices 830. The one or more operating systems 828, the software program 114 (FIG. 1) and the cognitive web application optimization program 108A (FIG. 1) in client computer 102 (FIG. 1), and the cognitive web application optimization program 108B (FIG. 1) in network server computer 112 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, b, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as a cognitive web application optimization program 108A and 108B (FIG. 1), can be stored on one or more of the respective portable computer-readable tangible storage devices 936, read via the respective R/W drive or interface 832, and loaded into the respective hard drive 830.

Each set of internal components 800a, b also includes network adapters or interfaces 836 such as a TCP/IP adapter cards, wireless Wi-Fi interface cards, or 3G or 4G wireless interface cards or other wired or wireless communication links. The cognitive web application optimization program 108A (FIG. 1) and software program 114 (FIG. 1) in client computer 102 (FIG. 1), and the cognitive web application optimization program 108B (FIG. 1) in network server 112 (FIG. 1) can be downloaded to client computer 102 (FIG. 1) from an external computer via a network (for example, the Internet, a local area network or other, wide area network) and respective network adapters or interfaces 836. From the network adapters or interfaces 836, the cognitive web application optimization program 108A (FIG. 1) and software program 114 (FIG. 1) in client computer 102 (FIG. 1) and the cognitive web application optimization program 108B (FIG. 1) in network server computer 112 (FIG. 1) are loaded into the respective hard drive 830. The network may comprise copper wires, optical fibers, wireless transmission, routers, firewalls, switches, gateway computers, and/or edge servers.

Each of the sets of external components 900a, b can include a computer display monitor 920, a keyboard 930, and a computer mouse 934. External components 900a, b can also include touch screens, virtual keyboards, touch pads, pointing devices, and other human interface devices. Each of the sets of internal components 800a, b also includes device drivers 840 to interface to computer display monitor 920, keyboard 930, and computer mouse 934. The device drivers 840, R/W drive or interface 832, and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
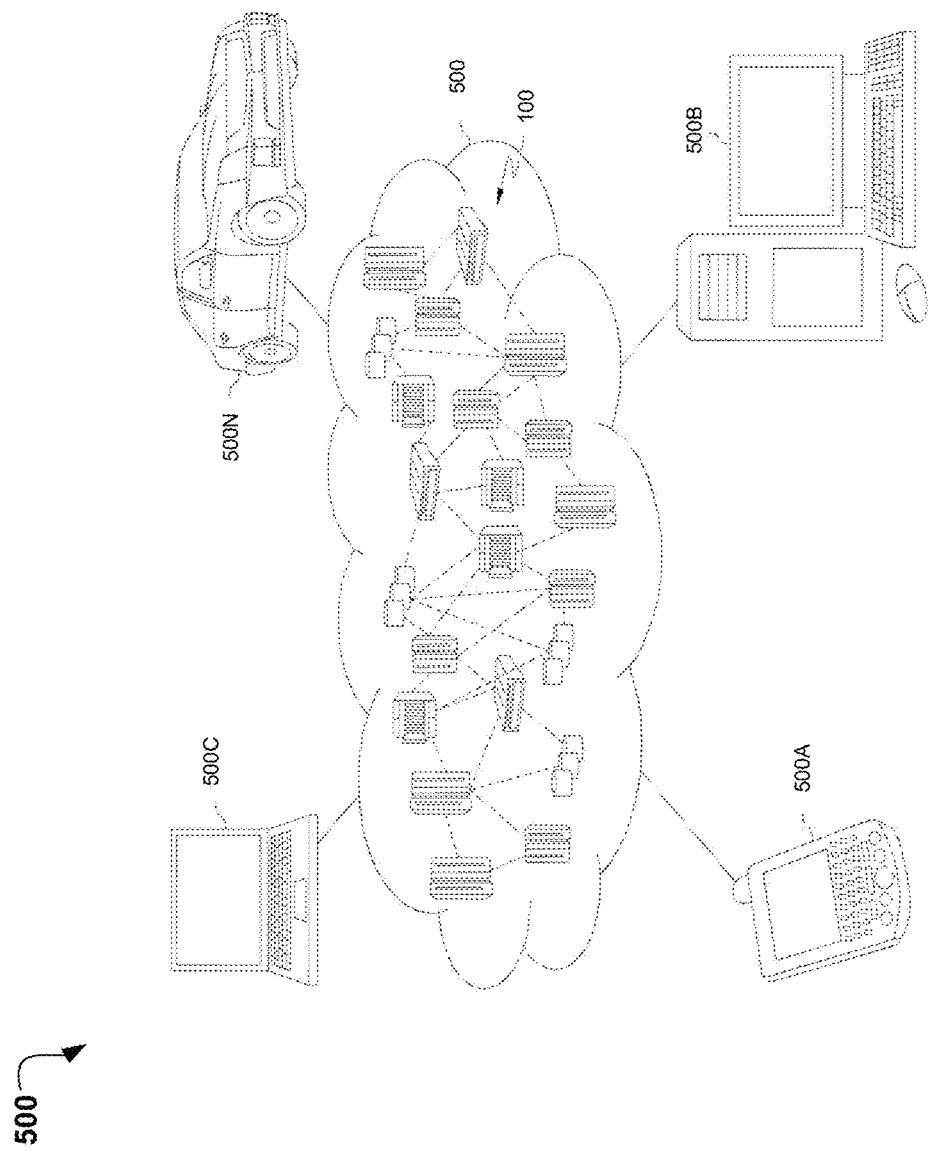
FIG. 5 is a block diagram of an illustrative cloud computing environment including the computer system depicted in FIG. 1, in accordance with an embodiment of the present disclosure.

Referring now to FIG. 5, illustrative cloud computing environment 500 is depicted. As shown, cloud computing environment 500 comprises one or more cloud computing nodes 100 with which local computing devices used by cloud consumers, such as, for example, personal digital assistant (PDA) or cellular telephone 500A, desktop computer 500B, laptop computer 500C, and/or automobile computer system 500N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 500A-N shown in FIG. 5 are intended to be illustrative only and that computing nodes 100 and cloud computing environment 500 can communicate with any type of computerized device over any type of network and/or network addressable connection (e.g., using a web browser).

Figure 6:
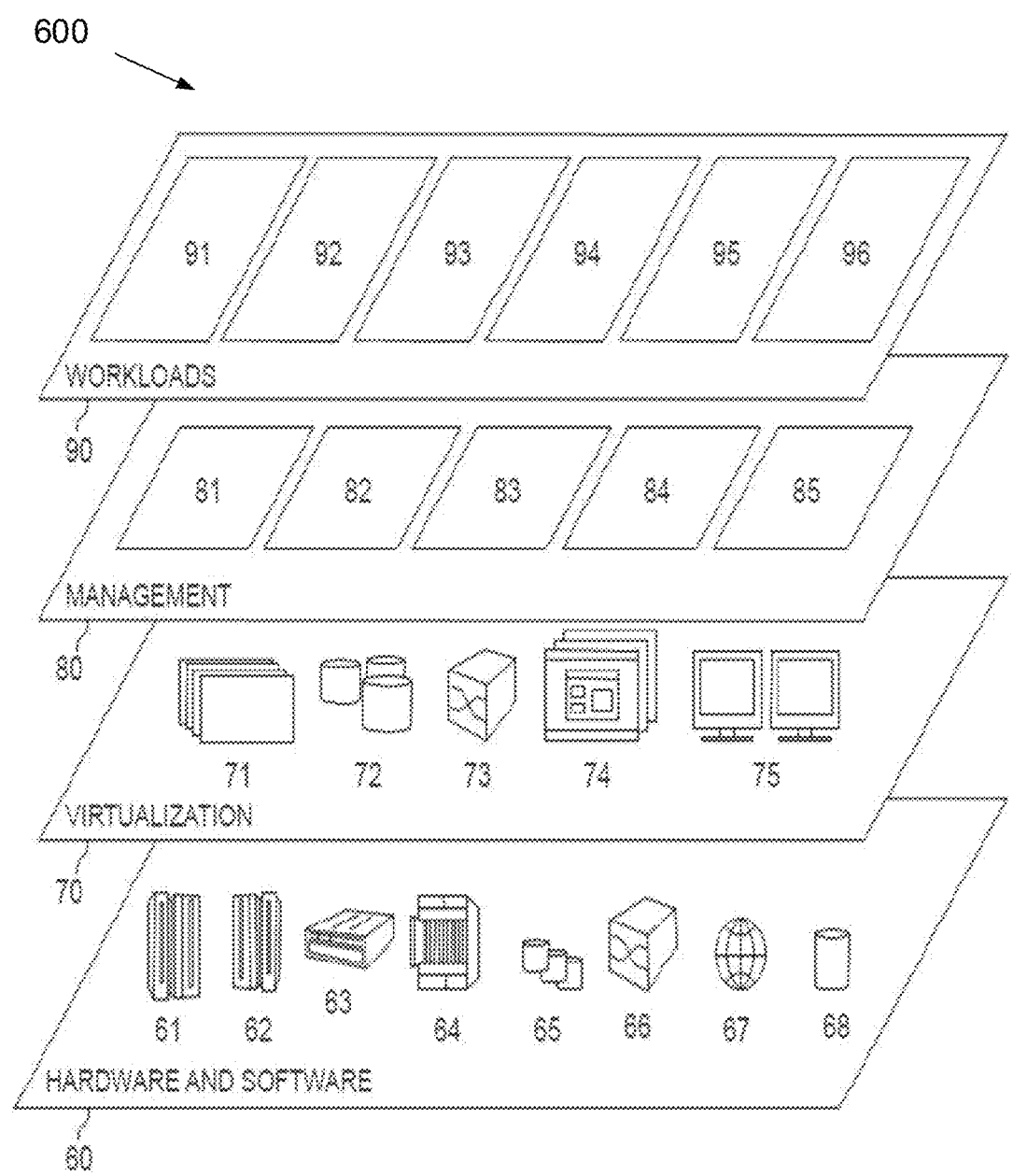
FIG. 6 is a block diagram of functional layers of the illustrative cloud computing environment of FIG. 5, in accordance with an embodiment of the present disclosure.

Referring now to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cognitive web application optimization 96. A cognitive web application optimization program 108A, 108B (FIG. 1) may be offered "as a service in the cloud" (i.e., Software as a Service (SaaS)) for applications running on mobile devices 102 (FIG. 1) and may dynamically and cognitively generate and deliver optimized web build layers for web applications.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for dynamically and cognitively generating and delivering web build layers for a web application, the method comprising:

receiving, by a computer, a file request associated with the web application, wherein the received file request comprises a request for loading content on the web application;

in response to receiving the file request, identifying a plurality of resource files associated with the received file request and the web application by querying, by a computer, at least one application server for the plurality of resource files;

determining, by a computer, whether the plurality of resource files are related based on tracked information and tracked user activity associated with the plurality of resource files, wherein the determining whether the plurality of resource files are related based on the tracked information and the tracked user activity associated with the plurality of resource files comprises determining whether there is a dependency relationship between the plurality of resource files, determining a frequency with which a user uses one or more of the plurality of resource files, and determining whether one or more of the plurality of resource files are restricted to a particular type of user;

generating a plurality of web build layers comprising the determined plurality of related resource files, wherein generating comprises determining different types of relationships between the plurality of identified resource files based on the tracked plurality of information and user activity, and grouping the plurality of identified resource files based on the determined different types of relationships, wherein in response to generating a plurality of different groupings of the plurality of determined related resource files based on the determined different types of relationships, selecting for delivery to the web application one or more groupings out of the plurality of different groupings based on a file size associated with each of the one or more groupings and network traffic associated with a network, wherein one or more of the plurality of the determined related resource files are included in two or more groupings associated with the plurality of different groupings; and based on the selection of the one or more groupings, delivering the generated plurality of web build layers to the web application based on the tracked plurality of information and user activity.

* * * * *